United States Patent [19]

Harris et al.

[11] Patent Number: 5,084,526
[45] Date of Patent: Jan. 28, 1992

[54] MISCIBLE BLENDS OF AN AMIDE AND/OR IMIDE CONTAINING POLYMER AND A POLYARYLATE

[75] Inventors: James E. Harris, Piscataway; Markus Matzner, Edison, both of N.J.; Lloyd M. Robeson, Macungie, Pa.

[73] Assignee: Amoco Corporation, Chicago, Ill.

[21] Appl. No.: 393,233

[22] Filed: Aug. 14, 1989

Related U.S. Application Data

[60] Division of Ser. No. 237,991, Aug. 29, 1988, Pat. No. 4,879,354, which is a continuation of Ser. No. 82,869, Aug. 6, 1987, abandoned, which is a continuation-in-part of Ser. No. 16,744, Feb. 19, 1987, abandoned, which is a continuation-in-part of Ser. No. 894,198, Aug. 7, 1986, abandoned.

[51] Int. Cl.⁵ .................. C08L 67/00; C08L 77/08
[52] U.S. Cl. .................. 525/425; 525/436
[58] Field of Search ........................ 525/425

[56] References Cited

U.S. PATENT DOCUMENTS

| | | | |
|---|---|---|---|
| 4,340,697 | 7/1982 | Aya et al. | 525/420 |
| 4,430,484 | 2/1984 | Quinn | 525/425 |

*Primary Examiner*—Ana L. Carrillo
*Attorney, Agent, or Firm*—Richard J. Schlott; William H. Magidson; Ralph C. Medhurst

[57] ABSTRACT

Described herein are miscible blends of polycarbonomides, defined as amide and/or imide containing polymers, and a polyarylate or arylate-carbonate copolymer which are useful in the manufacture of extruded sheets, high temperature connectors, aircraft and mass transportation vehicle interiors, injection molded articles, and extruded profiles and thermoformable articles.

5 Claims, No Drawings

MISCIBLE BLENDS OF AN AMIDE AND/OR IMIDE CONTAINING POLYMER AND A POLYARYLATE

REFERENCE TO RELATED APPLICATIONS

This is a division of application Ser. No. 237,991, filed Aug. 29, 1988, now U.S. Pat. No. 4,879,354, which is a continuation of Ser. No. 07/082,869, filed Aug. 6, 1987, abandoned, which is a continuation-in-part of U.S. Ser. No. 016,744, filed Dec. 19, 1987, abandoned, which is a continuation-in-part of U.S. Ser. No. 06/894,198, filed Aug. 7, 1986, abandoned.

BACKGROUND OF THE INVENTION

This invention relates to miscible blends of amide- and/or imide-containing polymers and polyarylates or arylate-carbonate copolymers and to a method for improving the miscibility of such blends. The blends are useful in the manufacture of extruded sheet, high temperature connectors, aircraft and mass transportation vehicle interiors, injection molded articles, and extruded profiles and thermoformable articles.

Aromatic polycarbonmides, by which is meant polyamides, polyimides and poly(amide-imides), may be viewed as a single class of polymers. Typically, these well-known aromatic polymers are high melting, high glass-transition temperature resins which exhibit excellent mechanical properties and heat resistance and very good chemical resistance. The main drawback of these materials is the fact that they are often extremely difficult to process. For example, the polyamide which may be described as the product of the self-condensation of p-aminobenzoic acid is always spun from solution, using powerful solvents such as sulfuric acid (nearly anhydrous or oleum), chlorosulfonic acid, fluorosulfonic acid, or combinations of lithium chloride with phosphorus compounds such as N,N-dimethyldimethyl phosphinamide and the like. Spinning may also be accomplished using nitrogen-containing solvents, such as, for example, N,N,N$^1$N$^1$-tetramethylurea, optionally in combination with an inorganic salt.

Better solubility characteristics are encountered with aromatic polyamides that are not wholly para-linked.

The high molecular weight polyamide prepared via the reaction of isophthaloyl chloride with m-phenylene diamine is soluble in chloroform. However, these polyamides are also very difficult to melt-process.

Polyamides possessing a flexibilizing oxygen bridge within their molecules, such as the polyamides based on 2,2-bis(4-(4-aminophenoxy)phenyl) propane and isoand/or terephthaloyl chlorides are said to have improved melt-fabricability characteristics. These resins exhibit good thermal stability, good electrical and mechanical properties, and can be molded into useful shapes, even though the moldability is still poor. The ease of fabrication may be improved by plasticizing these polyamides using, for example, various bisphthalimides, siloxanes and the like. Processibility may also be improved by blending with poly(aryl ether sulfones) or with polyarylates, as described in Japanese Patent Applications 58/52,348 and 58/52,347.

Aromatic polyimides are also a well known, and are described for example by Cassidy in Kirk-Othmer, Encyclopedia of Chemical Technology, 3rd Ed., Vol. 18, pp. 704–719. In general, polyimides, and especially aromatic polyimides, have excellent heat resistance but are difficult to process. The same is generally true of aromatic poly(amide-imides). Thus, according to P. E. Cassidy et al. (cited above), "wholly aromatic polyimide molding powders must be fabricated by sintering at high temperature and pressure". Injection molding and extrusion are ordinarily not possible. J. M. Aducci in Polyimides, K. L. Mittal, Editor, 1984, published by Plenum Press, New York, states on page 1024:

"Polyimides, produced by the chemical reaction of an aromatic dianhydride and an aromatic diamine, were the first of the aromatic thermally stable polymers introduced in the mid-1950's. Polyimides did not behave as thermoplastics even though they had linear structures. Polymer backbones comprised of rigid, inherently stable, aromatic phenylene and imide rings imparted polyimides with excellent thermal oxidative properties and at the same time made them exceedingly difficult to process because of their high and sometimes indeterminate melting points."

According to T. P. Gannett et al., in U.S. Pat. No. 4,485,140, the polyimide of the structural formula:

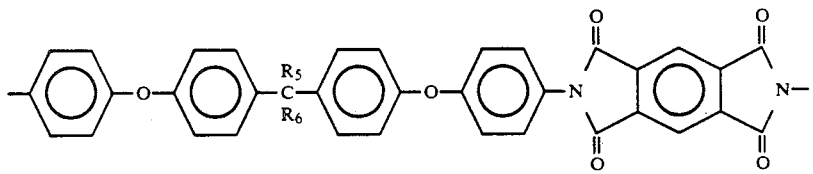

where $R_5$ and $R_6$ are $-CH_3$ or $-CF_3$, is typical of aromatic polyimides which are generally infusible. According to Alberino et al., U.S. Pat. No. 3,708,458, a polyimide having recurring units of the formula:

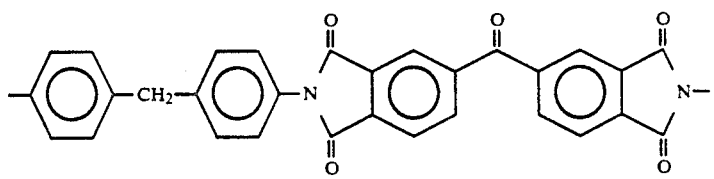

"possesses highly useful structural strength properties but . . . is difficult to mold, by compression at elevated temperatures, because of its relatively poor flow properties in the mold". These patentees also disclose polyimides having included in the polymer backbone a certain proportion of the reaction product of 3,3',4,4'-benzophenone tetracarboxylic dianhydride with 2,4- or 2,6-toluene diamine (or the corresponding diisocyanates). The copolymers are described as having better flow properties in the mold even though such difficult molding procedures "as sintering or hot processing" were the criteria used.

Thus, it can be said that aromatic imide-based polymers in general do not lend themselves easily to melt fabrication except perhaps by compression molding.

The processability of some of these imide-based materials may be improved by blending or alloying them with other resins which are themselves more readily melt processable and thereby more easily thermoformed and injection molded. For example, U.S. Pat. No. 4,293,670 to Robeson et al., discloses blends of polyarylether resins and polyetherimide resins having excellent mechanical compatibility and good impact strength and environmental stress crack resistance. U.S. patent application Ser. No. 537,042 filed on Sept. 29, 1983 in the name of J. E. Harris et al., assigned to the present assignee, describes blends of a selected polyarylketone and a polyetherimide. U.S. patent application Ser. No. 626,105 filed on June 29, 1984 in the name of J. E. Harris et al., assigned to the present assignee, describes blends of a poly(amide-imide) and of a poly(aryl ether ketone). In addition, U.S. Pat. No. 4,258,155 describes blends of poly(amide-imides) with polyetherimides.

Although polyarylates have been known in the technical literature since 1957, they have only recently become widely available from commercial sources. Polyarylates are polyesters derived from a dihydric phenol and at least one aromatic dicarboxylic acid, such as, for example, the polyarylate based on bisphenol A and a mixture of terephthalic and isophthalic acid. The processing and properties of polyarylates is described by L. M. Maresca and L. M. Robeson in "Engineering Thermoplastics: Properties and Applications", ed. by J. M. Margolis, p. 255, Marcel Dekker, Inc., New York, 1985. Arylate copolymers containing carbonate linkages in addition to the aromatic ester groups are also known. Phosgene or other carbonate-generating species are used along with the diacids and bisphenols for their preparation.

Blends of polyarylates with other polymers are the subject of several patents, including U.S. Pat. Nos. 4,231,922; 4,246,381; 4,259,458; and 3,946,091. U.S. Pat. No. 4,250,279 discloses blends of polyarylates with poly(etherimides), including blends of a particular polyarylate and a particular poly(etherimide) that are said to be miscible over a narrow range.

Miscibility in polymer blends may confer certain advantages. For example, such blends tend to be transparent, possess a single glass transition temperature and exhibit other characteristics of a single material. By varying the relative proportions of the blend components mechanical properties can be tailored to meet the requirements of a particular application without losing transparency and other desirable characteristics generally typical of single phase materials.

In the field of miscibility or compatibility of polymer blends, the art has found predictability to be unattainable, even though considerable work on the matter has been done. According to authorities:

(A) "It is well known that compatible polymer blends are rare". Wang and Cooper, *Journal of Polymer Science, Polymer Plastics Edition*, Vol. 21, p. 11 (1983).

(B) "Miscibility in polymer-polymer blends is a subject of widespread theoretical as well as practical interest currently. In the past decade or so, the number of blend systems that are known to be miscible has increased considerably. Moreover, a number of systems have been found that exhibit upper and lower critical solution temperatures, i.e., complete miscibility only in limited temperature ranges. Modern thermodynamic theories have had limited success to date in predicting miscibility behavior in detail. These limitations have spawned a degree of pessimism regarding the likelihood that any practical theory can be developed that can accommodate the real complexities that nature has bestowed on polymer-polymer interactions". Kambour, Bendler and Bopp, *Macromolecules*, 1983, Vol. 16, p. 753.

(C) "The vast majority of polymer pairs form two-phase blends after mixing can be surmised from the small entropy of mixing for very large molecules. These blends are generally characterized by opacity, distinct thermal, transitions, and poor mechanical properties. However, special precautions in the preparation of two-phase blends can yield composites with superior mechanical properties. These materials pay a major role in the polymer industry, in several instances commanding a larger market than either of the pure components. Olabisi, Robeson, and Shaw, *Polymer-Polymer Miscibility*, 1979, published by Academic Press, New York, N.Y., p. 7.

(D) "It is well known that, regarding the mixing of thermoplastic polymers, incompatibility is the rule and miscibility and even partial miscibility is the exception. Since most thermoplastic polymers are immiscible with other thermoplastic polymers, the discovery of a homogeneous mixture of partially miscible mixture of two or more thermoplastic polymers is, indeed, inherently, unpredictable with any degree of certain; P. J. Flory, *Principles of Polymer Chemistry*, Cornell University Press, 1953, Chapter 13, p. 555." Younes, U.S. Pat. No. 4,371,672.

(E) "The study of polymer blends has assumed an ever increasing importance in recent years and the resulting research effort has led to the discovery of a number of miscible polymer combinations. Complete miscibility is an unusual property in binary polymer mixtures which normally tend to form phase-separated systems. Much of the work has been of qualitative nature, however, and variables such as molecular weight and conditions of blend preparation have often been overlooked. The criteria for establishing miscibility are also varied and may not always all be applicable to particular systems." Saeki, Cowie and McEwen, *Polymer*, 1983, Vol. 25, January, p. 60.

Thus miscible blends are not common. The criteria for determining whether or not two polymers are miscible are now well established. According to Olabisi et al., *Polymer-Polymer Miscibility*, 1979, published by Academic Press, New York, N.Y., p. 120:

"The most commonly used method for establishing miscibility in polymer-polymer blends or partial phase mixing in such blends is through determination of the glass transition (or transitions) in the blend versus those of the unblended constituents. A miscible polymer blend will exhibit a single glass transition between the Tg's of the components with a sharpness of the transition similar to that of the components. In cases of borderline miscibility, broadening of the transition will occur. With cases of limited miscibility, two separate transitions between those of the constituents may result, depicting a component 1-rich phase and a component 2-rich phase. In cases where strong specific interactions occur, the Tg may go through a maximum as a function of concentration. The basic limitation of the utility of glass transition determinations in ascertaining polymer-polymer miscibility exists with blends composed of components which have equal or similar (20° C. difference) Tg's whereby resolution by the techniques to be discussed of two Tg's is not possible."

W. J. MacKnight, et al., in *Polymer Blends*, D. R. Paul and S. Newman, eds., 1978, published by Academic Press, New York, N.Y., state on page 188:

"Perhaps the most unambiguous criterion of polymer compatibility is the detection of a single glass transition whose temperature is intermediate between those corresponding to the two component polymers."

In this passage, it is clear from the omitted text that by compatibility the authors means miscibility, i.e., single phase behavior. See, for example, the discussion in Chapter 1 by D. R. Paul in the same work.

As a specific example of how difficult it is to predict a priori the miscibility of polymers, let us take an example from U.S. Pat. No. 4,258,155. Example 8 shows that the poly(amide-imides)

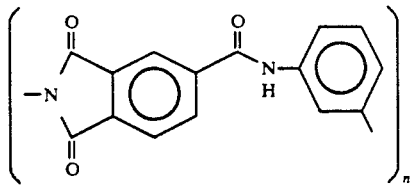

and the polyetherimide

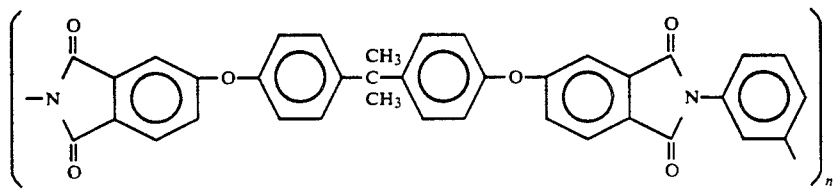

are miscible as evidenced by the single Tg of the blends. However, as described in European Patent Application

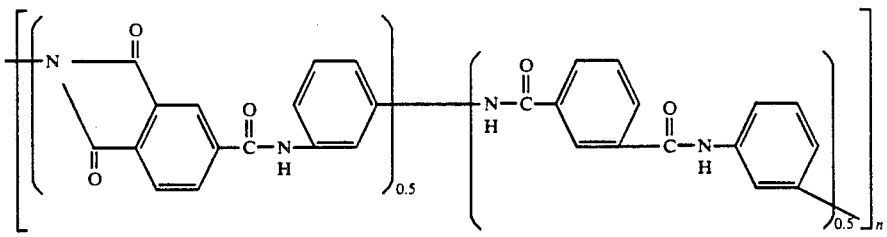

016,354, the closely related poly(amide-imide) copolymer is not miscible with the polyetherimide above even though it contains 50 mole percent of the identical amide-imide repeat units.

Along related lines, U.S. Pat. No. 4,340,697 describes blends of aromatic poly(amide-imides) and thermoplastic resins selected from the group consisting of a polyphenylene sulfide resin, a polysulfone resin, a polyamide resin, an aromatic polyester resin, a polyphenylene ether resin, and a phenoxy resin. Compositions with improved moldability characteristics are obtained; yet, in spite of a rather large number of systems examined, the patent does not mention that truly miscible alloys were uncovered.

Miscible blend compositions comprising polyarylates and amide and/or imide containing polymers would be a useful advance in the resin art.

BRIEF SUMMARY OF THE INVENTION

Polyarylates and their copolymers containing carbonate linkages form compatible blends with selected amide and/or imide-containing polymers. The compositions of this invention tend to form one phase in the amorphous state, and thus are miscible systems. Such blends are generally transparent, particularly when injection molded, and exhibit significantly improved processability compared with amide and/or imide containing polymers. Further, the glass transition temperature and therefore the ultimate use temperature of these blends is significantly greater than the polyarylate or arylate-carbonate copolymers used in forming the blends. The compositions of this invention also exhibit improved environmental stress crack resistance, as well as better melt processability.

DETAILED DESCRIPTION

The amide and/or imide-containing polymers useful in the practice of this invention may be more fully described as a class by the term aromatic "polycarbonomide," which term is inclusive of polyamides, polyimides and polyamide-imides. Still more particularly, these polymers may be characterized as being the product of the polycondensation of polycarboxylic acids having the formula $Ar(COOH)_n$ wherein n is 2, 3, or 4, or a derivative thereof, and aromatic polyamines having the formula H₂N—Ar¹—NH₂ or an appropriate derivative or precursor thereof. The Ar and Ar¹ groups will be independently selected carbocyclic radicals, such as, for example, an aromatic radical selected from the group consisting of mononuclear aromatic radicals such as phenylene, naphthalene and the like, di-, tri- and tetravalent polynuclear aromatic radicals comprising a plurality of aromatic nuclei interconnected by divalent bridging moieties such as ether, thioether, alkylidene, carbonyl, sulfone and the like.

Representative polycarboxylic acids include those having a single aromatic nucleus such as the various isomers of phthalic acid and trimellitic acid, as well as the di-, tri- and tetra- functional polynuclear aromatic carboxylic compounds represented by

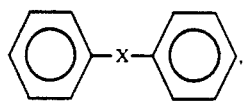

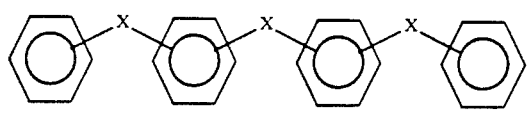

and the like, wherein each X may be the same or different divalent bridging moiety selected from —O—, —S—, —SO₂, C₁-C₃ alkylidene, —CO—, and the like.

The Ar¹ group of the aromatic polyamine component of the polycarbonomide will preferably be a polynuclear aromatic radical comprising a plurality of aromatic carbocyclic nuclei interconnected by divalent bridging groups such as ether, thioether, alkylidene, carbonyl, sulfone and the like. Such diamines include those represented by the formulae:

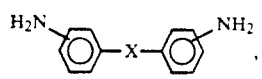

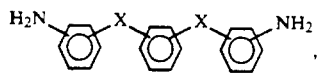

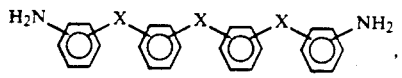

wherein X has the meaning given hereinabove.

The preferred polycarbonomides are the imide and/or amide containing polymers comprising recurring units selected from the group represented by the following structural formulae:

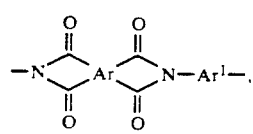

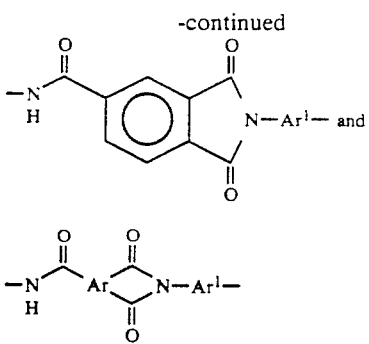

wherein Ar and Ar¹ are aromatic radicals selected independently from the group consisting of

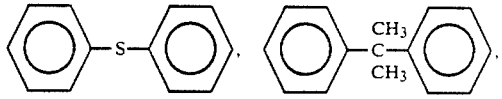

and mixtures thereof.

The amide and/or imide containing polymers may be homopolymers, random copolymers, and block copolymers. It should be noted that the amide and/or imide containing polymers may be based on more than one diamine or polycarboxylic acid, and may include minor amounts, up to 20 mole %, of other diamines or polycarboxylic acids which do not substantially affect miscibility.

To form miscible blends with polyarylates according to the teachings of this invention, the recurring units of the aromatic polycarbonomides will comprise at least one alkylidene-linked polynuclear aromatic radical, preferably forming the arylene (Ar¹) portion of the polyamine component. The weight fraction of alkylidene units present in the polycarbonomide will affect miscibility with the polyarylate, the minimum level of alkylidene units necessary for miscibility depending upon the relative amounts of amide and imide group linking the aromatic components of the polycarbonomide. In general, for the blends of this invention, the minimum level of alkylidene (as represented by isopropylidene) linkages necessary for miscibility may be determined by the relationship:

$$\text{wt \% isopropylidene units (minimum)} \geq 8\text{-}3(\text{Imide})$$

wherein (Imide) is the fraction of imide groups present in the polycarbonomide, i.e., (Imide)+(Amide)=1. The preferred minimum content of isopropylidene linkages will be:

$$\text{wt \% isopropylidene units (minimum)} \geq 12\text{-}2(\text{Imide})$$

Therefore, the preparation of polycarbonomides useful in the practice of this invention will include a sufficient amount of units derived from a polynuclear aromatic diamine or polynuclear aromatic polycarboxylic acid having divalent isoalkylidene, preferably isopropylidene bridging unit or moiety to provide the requisite level of isoalkylidene units for miscibility.

The polycarbonomides useful in the practice of this invention are prepared by any of the methods well known in the art. For example aromatic polyamides may be prepared by a solution process, i.e., by reacting the acid chloride and the diamine in an appropriate solvent such as N-methyl-pyrrolidone, N,N,N',N'-tetramethylurea, N,N-dimethylacetamide, N-methyl-caprolactam, hexamethylphosphoramide, chloroform, methylene chloride, and the like, optionally in the presence of an added inorganic salt such as lithium chloride or calcium chloride and/or in the presence of an added acid acceptor. The polyamides can also be prepared via an interfacial route, or by the reaction of a diisocyanate with a diacid. Polyamides may be prepared, for example by reacting at temperatures ranging from ambient to about 175° C., an organic diamine with a tetracarboxylic acid dianhydride. Alternatively, a tetracarboxylic acid dianhydride can be reacted with a diisocyanate, in place of the diamine. Reaction of an isocyanate with the anhydride group yields a seven membered cyclic intermediate which spontaneously collapses to form the imide with evolution of carbon dioxide. Similar reactions are used for the preparation of the poly(amide-imides) except that a tricarboxylic acid monoanhydride or derivative thereof is used instead of the tetracarboxylic acid dianhydride. Poly(amide-imides) may also be prepared via the routes shown in the following equations I-IV. The chemistry of these routes is the same as that described above for the preparation of polyamides, poly(amide-imides) and polyimides. Note that the terms dicarboxylic acid, tricarboxylic acid monoanhydride, and diamine are meant to include appropriately reactive derivatives thereof as required for the polymerizations. Thus, the term dicarboxylic acid includes also the corresponding diacid chloride; the term diamine includes also the corresponding di-N-acylated derivative; these latter materials were shown to be very useful for the preparation of poly(amide-imides)—see Keske, Polymer Preprints, Vol. 25, No. 2, p. 12 (1984).

I: Dianhydride of a tetracarboxylic acid + dicarboxylic acid + diamine→poly(amide-imide)

II: Tricarboxylic acid monoanhydride + dicarboxylic acid + diamine→poly(amide-imide)

III: Tricarboxylic acid monoanhydride + dianhydride of a tetracarboxylic acid + diamine→poly(amide-imide)

IV: Tricarboxylic acid monoanhydride + dianhydride of a tetracarboxylic acid + dicarboxylic acid + diamine→poly(amide-imide)

The materials useful in equations I-IV are Ar(-COOH)$_n$ and H$_2$NAr$^1$NH$_2$ as defined above; in addition, minor amounts of up to 20 mole %, preferably of up to 10 mole %, and most preferably not more than about 5 mole % of other polycarboxylic acid and/or diamine components, such as araliphatic, cycloaliphatic, aliphatic components, and the like may be employed.

Monomers containing isoalkylidene, preferably isopropylidene bridges are available commercially, and may be prepared by known processes. In general terms, the starting materials for the preparation of these monomers are typically aromatic nuclei twice-substituted with isoalkenyl groups, such as 1,4-di-isopropenyl benzene or the like. The acid-catalyzed condensation of such compounds with aniline leads to the desired diamino monomers, while the Friedel-Crafts reaction with an alkyl-substituted aromatic hydrocarbon, e.g., xylene, followed by oxidation and dehydration yields dianhydrides containing isoalkylidene or isopropylidene bridges. Similar approaches can be used to prepare the tricarboxylic acid monoanhydrides as well as the dicarboxylic acids having isoalkylidene or isopropylidene groups within their molecules.

The polyarylates which are suitable for use in this invention are polymers and copolymers derived from a dihydric phenol and at least one aromatic dicarboxylic acid, and will include arylate-carbonate copolymers wherein a portion of the dicarboxylic acid component is replaced by a carbonate precursor such as a carbonyl halide, a carbonate ester or a bisphenol dihaloformate. The polyarylates will have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

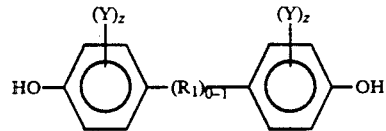

wherein Y is selected from hydrogen, alkyl groups of 1 to 4 carbon atoms, chlorine or bromine, each z, independently, has a value of from 0 to 4, inclusive, and R$_1$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, SO$_2$, or S. The dihydric phenols may be used individually or in combination. Bisphenol-A is the most preferred bisphenol.

The aromatic dicarboxylic acids that may be used in forming the polyarylates used in the practice of this invention include terephthalic acid, isophthalic acid, any of the naphthalene dicarboxylic acids and mixtures thereof, as well as alkyl substituted homologs of these carboxylic acids wherein the alkyl group contains from 1 to about 4 carbon atoms, and acids containing other inert substituents, such as halides, alkyl or aryl ethers, and the like. Hydroxybenzoic acids can also be used. Preferably, mixtures of isophthalic and terephthalic acids are used. The isophthalic acid to terephthalic acid ratio in the mixture will be about 0:100 to about 100:0, preferably from about 75:25 to about 50:50. From about 0.5 to about 20 percent of aliphatic diacids containing from 2 to about 10 carbon atoms, such as adipic acid, sebacic acid, and the like may also be included.

The polyarylates useful in the practice of this invention are well known and widely-available commercially. The polyarylates may also be prepared by any of the well known prior art polyester forming reactions, such as the reaction of the acid chlorides of the diaryl esters of the aromatic dicarboxylic acids with the dihydric phenols; or the reaction of the aromatic diacids with diester derivatives of the dihydric phenol.

The arylate-carbonate copolymers and their preparation are described, for example, in U.S. Pat. No. 3,169,121, herein incorporated by reference. Such copolyesters, which comprise recurring carbonate groups, carboxylate groups and aromatic carbocyclic groups in the linear polymer chain, may be readily obtained commercially or prepared by reacting, as essential ingredients, a difunctional carboxylic acid, a difunctional phenol, and a carbonate precursor. The methods for preparing these copolyesters are well known. In general, a bisphenol or its ester-forming derivative is condensed with a diacid or its ester-forming derivative, and with a carbonate precursor. Typical carbonate precursors are carbonyl halides, carbonate esters, or bisphenol dihaloformates. Obviously mixtures of bisphenols and of diacids can also be used. The preferred poly(arylate-carbonates) may contain up to 65 mole % of carbonate linkages; however, for most purposes, the arylate-carbonate copolymers will contain less than 50 mole % of carbonate linkages.

The blends of this invention will comprise from about 2 to about 98, preferably from about 20 to about 80 weight percent polyarylate and, correspondingly, from about 98 to about 2, preferably from about 80 to about 20 wt % of the polycarbonamide.

The blends of this invention may be further compounded with such additional materials as mineral fillers including chalk, calcite or other carbonates or dolomite; mica, talc, wallastonite; silicon dioxide and similar silicates; glass spheres; glass powders; aluminum; clay; quartz; and the like, as well as reinforcing fibers such as fiberglass, carbon fibers, and the like. The blends may also include dyes, pigments and similar additives such as carbon black and titanium dioxide; thermal stabilizers; ultraviolet light stabilizers, plasticizers, flame retardants and the like, as is commonly practiced in the resin art. The blends of the instant invention may optionally include additional thermoplastic polymers such as poly(aryl ether ketones), polysulfones, poly(ether sulfones), poly(aryl sulfones), poly(aryl ether sulfones), liquid crystalline aromatic polyesters; poly(ether imides), polycarbonates, polyesters such as poly(ethylene terephthalate), aliphatic and aliphatic-aromatic polyamides (such as Nylon 6,6), and fluorocarbon polymer.

The blends of this invention may be fabricated into any desired shape, i.e., moldings, coatings, films, or fibers.

EXAMPLES

The practice of this invention may be better understood from consideration of the following examples, which are provided as specific illustrations of the practice of this invention.

The following designations used in the examples have the following meaning:

Imide I—a polymer containing repeat units of the following formula:

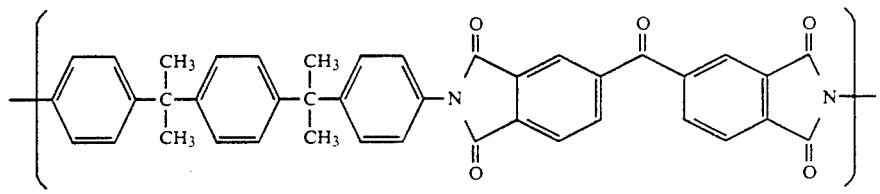

having an inherent viscosity of 0.48 dl/g as measured in N-methylpyrrolidone (NMP) at 25° C. (0.2 g/100 ml solution). The polymer contained 13.3% by weight of isopropylidene units and the ratio of amide to imide groups was 0:1. See Control E for preparation details.

Imide II—a polymer containing repeat units of the following formula:

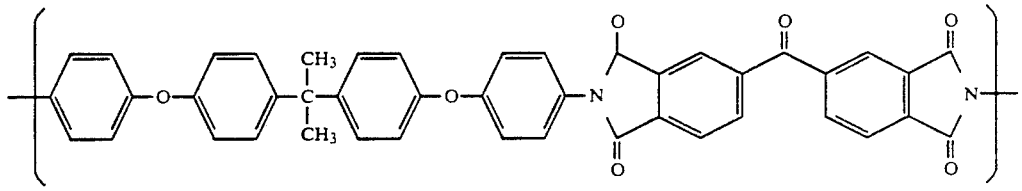

The polymer was not soluble in NMP and contained 6.0% by weight of isopropylidene units. The ratio of amide to imide groups was 0:1.

Imide II was prepared by the following method. To a 500 ml round-bottom flask, fitted with a thermometer and mechanical stirrer, was added 0.050 moles of the diamine and 100 g of dimethyl acetamide. The solution was stirred and cooled in an icebath to 10°–15° C. Following addition of 16.11 g (0.050 moles) of benzophenone tetracarboxylic acid dianhydride in 10.0 g of dimethyl acetamide, the amber colored solution was stirred for three hours at 20°-23° C. The solution was then diluted with 200 ml of dimethyl acetamide. Imidization was accomplished by adding 11.85 g (0.15 moles) of acetic anhydride and about 7.5 ml of pyridine to the solution and stirring overnight at room temperature. The following day, the contents of the flask were coagulated in deionized water, rinsed twice with acetone and dried in a vacuum over at 80° C. to constant weight.

Imide III—a polymer containing repeat units of the following formula:

tional 0.15 moles of pyridine and 0.30 moles of acetic anhydride. The solution was heated for one hour at 90°-100° C. The resulting solution or semisolid was coagulated in two liters of methanol. The resulting fluff was collected and reslurried in two liters of fresh methanol. Following collection of this fluff by filtration, the polymer was dried in a vacuum oven at 90° C. for 16 hours. The I.V. of the polymer was 0.84 dl/g as measured in NMP at 25° C.

Imide IV—a polymer containing repeat units of the following formula:

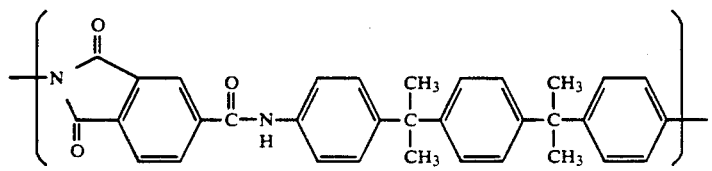

The polymer contained 16.8% by weight of isopropyl-

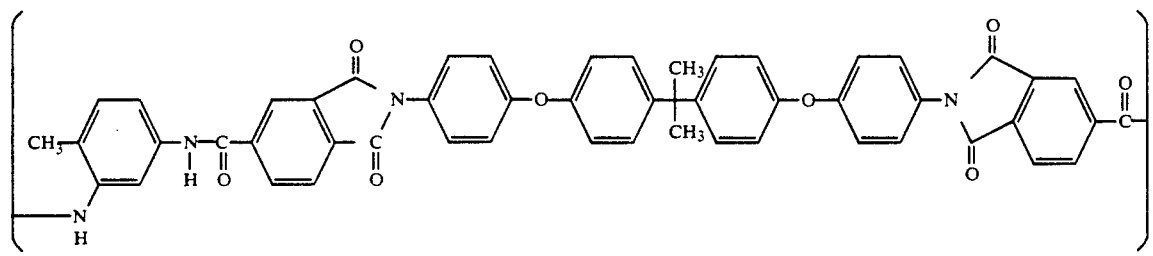

idene units and the ratio of amide to imide groups was 0.5:0.5.

Imide III was made by the following procedure. A 0.05 mole quantity of the aromatic diamine was placed in a 500 ml round-bottom flask containing 120 g of N,N-dimethylacetamide (DMAC). Upon dissolving, the solution was cooled to 0° C. and 0.05 moles of trimellitic anhydride acid chloride were added. The solution was allowed to come to room temperature while being stirred, at which point 0.15 moles of pyridine were added. The yellow color solution was stirred for 2 hours and then treated with 120 g of DMAC, an addihaving an I.V. of 0.50 dl/g as measured in NMP at 25° C. The polymer contained 5.1% by weight of isopropylidene units and the ratio of amide to imide groups was 0.5:0.5.

Imide V—a random copolymer containing repeat units of the following formulas:

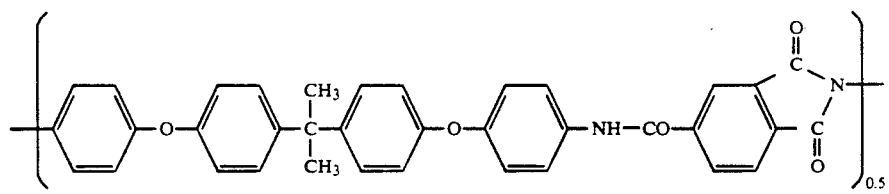

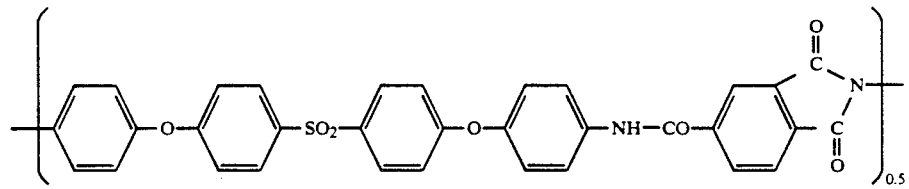

having an I.V. of 0.59 dl/g as measured in NMP at 25° C. The polymer contained 3.6% by weight of isopropylidene groups and the ratio of amide to imide groups was 0.5:0.5.

Imide VI—a polymer containing repeat units of the following formula:

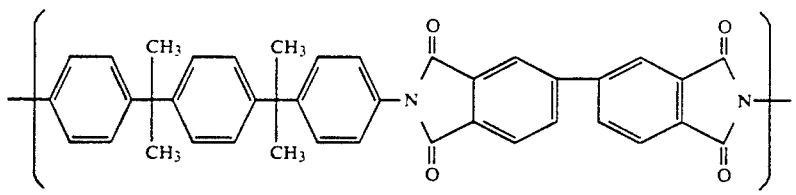

having an I.V. of 0.49 dl/g as measured in chloroform at 25° C. The polymer contained 14% by weight of isopropylidene groups and the ratio of amide to imide groups was 0:1.

Imide VII—a random copolymer containing repeat units of the following formulas:

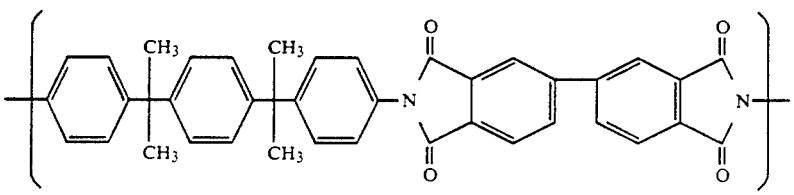

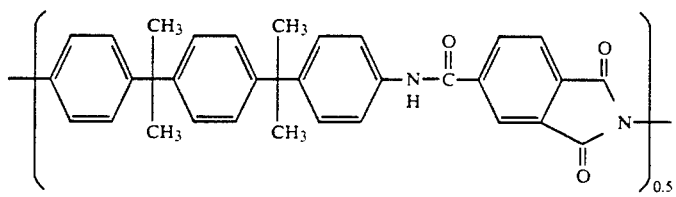

having an I.V. of 0.66 dl/g in chloroform at 25° C. The polymer contained 15.2% by weight of isopropylidene groups and the ratio of amide to imide groups was 0.25:0.75.

Imide VIII—a polymer containing repeat units of the following formula:

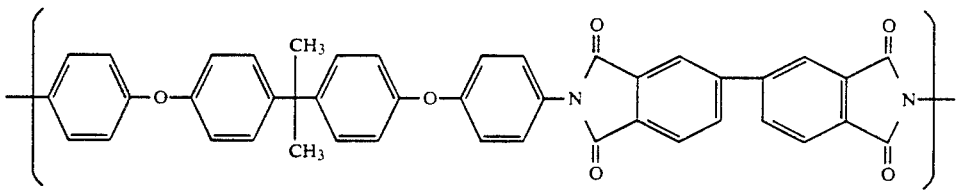

having an I.V. of 1.15 dl/g in NMP at 25° C. The polymer contained 6.3% by weight of isopropylidene groups and the ratio of amide groups to imide groups was 0:1.

Arylate I was obtained from Union Carbide Corp., as Ardel D100 and had the following structure:

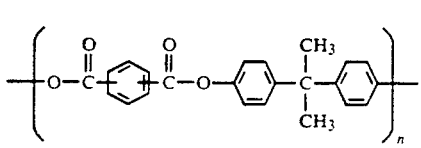

where the proportion of para to meta bonds in the diacid residuum was 50/50.

Arylate II was made by the polycondensation of bis-phenol-A diacetate with isophthalic acid in the presence of diphenyl ether as the processing aid. The procedure is described in U.S. Pat. No. 4,294,956. The polymer had the structure:

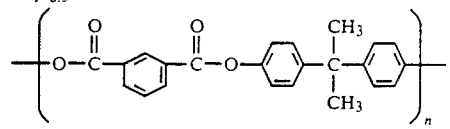

where the bonds in the diacid residuum are all meta; the polyarylate had an I.V. of 0.6 dl/g as measured in a 60/40 phenol/tetrachloroethane mixture at 25° C.

Arylate III was obtained from Celanese Polymer Company, as Durel DKX003 and had the following structure:

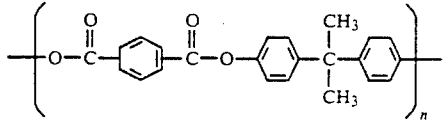

where the proportion of para to meta bonds in the diacid residuum is 25/75.

Poly(arylate-carbonate) I was obtained from the General Electric Co. as Lexan 3250 and had the following structure:

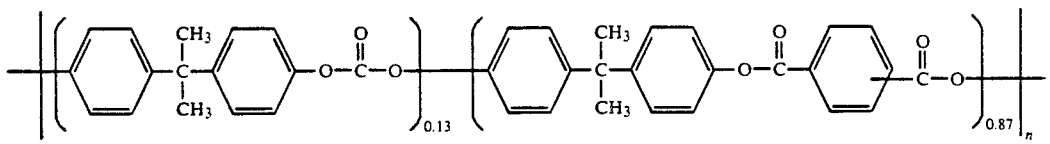

where the proportion of para to meta bonds in the diacid residuum was 73/27.

Poly(arylate-carbonate) II was obtained from the General Electric Co., as Lexan 4501 and had the following structure:

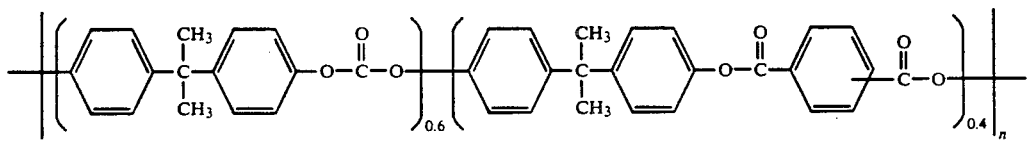

where the proportion of para to meta bonds in the diacid residuum was 30/70.

Poly(arylate-carbonate) III was obtained from the General Electric Co., as Lexan 4701 and had the following structure:

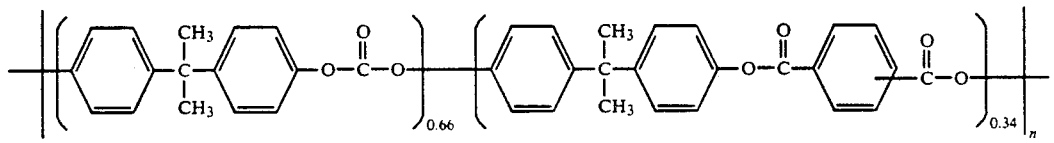

where the proportion of para to meta bonds in the diacid residuum was 83/17.

Polycarbonate I was obtained from the General Electric Co., as Lexan 101 and had the following structure:

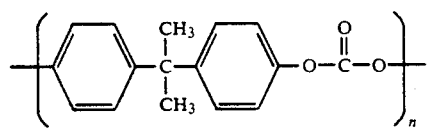

CONTROL A

Imide I was compression molded in a 4×4×0.20 inch cavity mold at about 380° C. in a South Bend hydraulic press. The sample was cooled while in the press by passing water through cooling channels within the platens. Cooling from 380° C. to room temperature took about 10 minutes. One-eighth inch strips were shear cut from the molded product. These strips were tested for 1% secant modulus according to a procedure similar to ASTM D-638, tensile strength and elongation at break according to ASTM D-638, and pendulum impact strength. Pendulum impact strength is measured as follows: A steel pendulum is used, cylindrical in shape with a diameter of 0.83 inch and weighing 1.562 pounds; the striking piece, mounted almost at the top of the pendulum, is a cylinder 0.3 inch in diameter; film specimens, 4 inches long, 0.125 inch wide and about 1 to 30 mils thick, are clamped between the jaws of the tester so that the jaws are spaced one inch apart; the 0.125 inch width of the film is mounted vertically, the pendulum is raised to a constant height to deliver 1.13 foot pounds at the specimen; when the pendulum is released, the cylindrical striking piece hits the specimen with its flat end, breaks the film, and travels to a measured height beyond; the difference in the recovery height (i.e., the difference in the potential energy of the pendulum at the maximum point of the upswing), represents the energy absorbed by the specimen during the rupture; the impact strength, expressed in foot-pounds per cubic inch, is obtained by dividing the pendulum energy loss by the volume of the specimen. The results are shown in Table I.

The glass transition temperature of the molded plaque as measured by two methods. The modulus-resilience method described by Olabisi, et al., in Polymer-Polymer Miscibility, Academic Press, NY, p. 126, was used to determine the Tg of the as-molded plaque at a heating rage of 1.6° C./min. The Tg of Control A was also determined by placing it in a DuPont 1090 thermal analyzer equipped with a dual DSC sample cell. The Tg (or Tgs) was determined by methods well known in the field of polymer science, by heating at 10° K./min. The results are shown in Table II.

An estimate of the melt processability of a polymer or of a polymer blend can be obtained as follows. In the modulus-resilience measurement which is used to determine the Tg as described above, a one-eighth inch wide 0.020-inch thick strip with a gauge length of two inches is clamped between the jaws of an Instron mechanical tester. The sample is surrounded with an oven with glass windows to permit observation while it is heated at 1.6° C./min. This allows for the determination of the modulus-temperature and resilience-temperature curves. The temperature at which the sample will not support is own weight in the vertical position and begins to droop, is called the flow temperature. For a given resin the flow temperature has been found to be a good approximation of the temperature required for melt processing by extrusion or injection molding. Polymers which are very viscous or have poor melt stability due to thermal crosslinking are generally said to have no flow temperature as none can be measured up to 400° C. which is the temperature limitation on the Instron oven. The flow temperature for Control A is given in Table I.

CONTROL B

Imide II was compression molded in a 4×4×0.02 inch cavity mold at about 380° C. in a South Bend hydraulic press. The sample was cooled while in the press by passing water through cooling channels within the platens. The molded plaque was tested in Control A and the results are given in Tables I and II.

CONTROL C

Imide III was compression molded in a 4×4×0.02 inch cavity mold at about 380° C. in a South Bend hydraulic press. The sample was cooled while in the press by passing water through cooling channels within the platens. The molded plaque was tested for mechanical properties and Tg as in Control A and the results are given in Tables I and II.

CONTROL D

Arylate I was compression molded in a 4×4×0.02 inch cavity mold at about 380° C. in a South Bend hydraulic press. The sample was cooled while in the press by passing water through cooling channels within the platens. The molded plaque was tested as in Control A and the results are given in Tables I and II.

CONTROL E

To a 3-liter round bottomed flask were added 875 g of N-methyl-pyrrolidone and 52.37 g (0.15225 moles) of bis(aniline P),

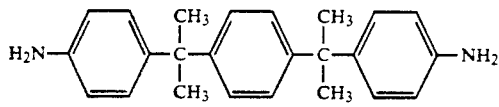

After the diamine had dissolved, 48.3 g (0.15 moles) of benzophenone-3,3',4,4'-tetracarboxylic acid dianhydride (BTDA) were charged with vigorous stirring. 0.66 g (0.0045 moles) of phthalic anhydride, 0.15 moles of p-toluene sulfonic acid and 375 g of chlorobenzene were then charged. The mixture was stirred at room temperature for 30 minutes, then heated to reflux (150°-160° C.) over two hours. The solution was refluxed for 4 hours; it was cooled, filtered and the filtrate diluted with 1250 ml. of N-methylpyrrolidone (NMP). Coagulation in methanol yielded the polyimide, designated Imide I, which was first air-dried, followed by drying in a vacuum oven at 100° C. for about 16 hours. The I.V. of the material was 0.48 dl/g as measured in NMP at 250° C. (0.2 g/100 ml. of solution).

The light yellow powder obtained above was compression molded in a 4×4×0.020 inch cavity mold at about 370° C. in a South Bend hydraulic press. The resin was cooled by passing water through cooling channels within the platens. The molding was tested for mechanical properties and Tg as in Control A. In addition, the melt flow index of the resin was determined by a method similar to ASTM D1238 at 375° C. The results are given in Tables III and IV.

EXAMPLE 1

36 parts by weight of Imide I of Control A and 64 parts by weight of Arylate I were melt blended in a Brabender Plasticorder mixer at about 380° C. The blend was then compression molded in a 4×4×0.020 inch cavity mold at about 380° C. in a South Bend hydraulic press. The blend was cooled while in the press by passing water through cooling channels within the platens. The molded blend was tested as in Control A and the results are given in Tables I and II.

EXAMPLE 2

50 parts by weight of Imide II of Control B and 50 parts by weight of Arylate I were melt blended in a Brabender Plasticorder mixer at about 380° C. The blend was then compression molded in a 4×4×0.020 inch cavity mold at about 380° C. in a South end hydraulic press. The blend was cooled while in the press by passing water through cooling channels within the platens. The molded blend was tested as in Control A and the results are given in Tables I and II.

EXAMPLE 3

50 parts by weight of Imide III of Control C and 50 parts by weight of Arylate I were melt blended in a Brabender Plasticorder mixer at about 380° C. The blend was then compression molded in a 4×4×0.020 inch cavity mold at about 380° C. in a South Bend hydraulic press. The blend was cooled while in the press by passing water through cooling channels within the platens. The molded blend was tested for mechanical properties and Tg as in Control A and the results are given in Tables I and II.

In addition, the melt flow index of the blend was determined by a procedure similar to ASTM D1238 at 375° C. and 43.25 psi. The blend had a melt flow of 2.2 grams/10 minutes after a 10-minute preheat compared with no flow for Imide Polymer III. The flow of the blend after a 30-minute preheat was 0.9 grams/10 minutes.

CONTROLS F, G AND H

Arylates I, II and III were compression molded in a 4×4×0.020 inch cavity mold at about 350° C. in a South Bend hydraulic press. The resins were cooled while in the press by passing water through cooling channels within the platens. The moldings were tested for mechanical properties and Tg as in Control E. The results are given in Tables III and IV.

EXAMPLES 4, 5 AND 6

50 parts by weight of Polyimide I of Control E (prepared as described in detail above) were blended with 50 parts of the Arylates I, II or III in a Brabender Plasticorder mixer at 350° C. The blends were compression molded in a 4×4×0.020 inch cavity mold at about 350° C. in a South Bend hydraulic press. The blends were cooled while in the press by passing water through cooling channels within the platens. The moldings were tested for mechanical properties and Tg as in Control E. The results are given in Tables III and IV.

As is indicated by the data of Table IV, polyarylates are miscible with Imide I regardless of the para/meta (tere/iso) ratio in the diacid residuum. Addition of Imide I increases the Tg of the polyarylates while the addition of a polyarylate to the Imide I improves its melt flow and hence processability.

CONTROLS I, J AND K

Poly(arylate-carbonates) I, II and III were compression molded in a 4×4×0.020 inch cavity mold at about 350° C. in a South Bend hydraulic press. The resins were cooled while in the press by passing water through cooling channels within the platens. The moldings were tested for mechanical properties and Tg as in Control E. The results are given in Tables V and VI.

CONTROL L

Polycarbonate I was compression molded into a 4×4×0.020 inch plaque at about 350° C. in a South Bend hydraulic press. The resin was cooled while in the press by passing water through cooling channels within the platens. The molding was tested for mechanical properties and Tg as in Control E. The results are given in Tables V and VI.

EXAMPLES 7, 8, 9 AND 10

50 parts by weight of Imide I (see detailed preparation above) of Control E or Imide III of Control C were mixed with 50 parts by weight of the Poly(arylate-carbonate) I, II or III at 350° C. in a Brabender Plasticorder mixer. The blends were compression molded in a 4×4×0.020 inch cavity mold at about 350° C. in a South Bend hydraulic press. The blends were cooled while in the press by passing water through cooling channels within the platens. The moldings were tested for mechanical properties, Tg and melt-flow index as in Control E. The results are summarized in Tables V and VI. The melt flow data at 442.5 psi were: for Example 7, MF10=0.86 dg/min., MF30/MF10=0.97; for Example 8, MF10=0.35 dg/min., MF30/MF10=1.64.

EXAMPLE 11

A blend containing 50 parts by weight of Polycarbonate I and 50 parts by weight of Imide III of Control C was made in a Brabender Plasticorder mixer at about 350° C. The blend was compression molded in a 4×4×0.020 inch cavity mold at about 350° C. in a South Bend hydraulic press. The blend was cooled while in the press by passing water through cooling channels within the platens. The molding was tested for mechanical properties, Tg and melt flow characteristics as described in Control E. The results are given in Tables V and VI. The melt flow data were MF10=1.00 dg/min., MF30/MF10=25.2.

The results given above demonstrate that:

1) Blends of selected amide and/or imide containing polymers, or polycarbonomides, with polyarylates are miscible as indicated by the single Tg having a value intermediate between those of the constituents.

2) For blends that are miscible, the Tg of the blend is significantly greater than that of the polyarylate.

3) The blends are significantly improved in processability, compared with the polycarbonomide component.

4) Polycarbonomides, i.e., polyimides, poly(amide-imides) and polyamides having a minimum isopropylidene content defined by the relationship:

wt % isopropylidene units (minimum) ¶8-3(imide), where (imide) is the fraction of imide groups in the polymer, are miscible with the polyarylates. Examples of the validity of the above relationship are given in Table VII which gives the phase behavior of blends of equal parts by weight of polyarylate I with various imide-containing polymers. Miscibility was judged by the presence of only one Tg and by the transparency of the blend.

5. Blends of polycarbonomides with arylate-carbonate copolymers appear to have reduced miscibility, as reflected by the occurrence of 2 Tg values for most blends, summarized in Table VI. However, the blends having less than 50 mole % carbonate groups are miscible. Compositions comprising arylate-carbonate copolymers having greater than 50 mole % carbonate groups, though less miscible, exhibit improved processability and have properties useful for many applications.

It will thus be apparent that the instant invention is a miscible composition comprising a polyarylate and a aromatic polycarbonomide, wherein the polycarbonomide is a condensation polymer comprising units which may be derived from particular aromatic polycarboxylic acids and particular aromatic polyamines. Said polycarbonomide may be further described as containing at least 5 wt % isoalkylidene, preferably isopropylidene moieties as divalent radicals linking the aryl nuclei of a polynuclear aromatic radical forming either or both the aromatic polyamine and the aromatic polycarboxylic acid components of the polycarbonomide. The miscibility of the polycarbonomide with the polyarylate component will depend upon the isopropylidene content of the polycarbonomide in relationship to the imide and amide group content thereof, and the minimum level of isopropylidene content needed for miscibility will increase as the proportion of imide groups decreases. The polycarbonomides may further comprise minor amounts, ordinarily up to 20 mole %, of recurring units based on other polycarboxylic acids and diamines which ordinarily are immiscible with polyarylates. For example, polyimides based on pyromellitimide are generally crystalline, high melting and incompatible with polyarylates. The compositions of this invention may include polycarbonomides comprising up to 20 mole % pyromellitimide units without losing the miscibility imparted by the isoalkylilene-containing recurring units.

The invention may thus also be described as a method for improving the compatibility of polycarbonomides and polyarylates by incorporating isopropylidene moiety-containing polycarboxylic acids or polyamines into the polycarbonomide component. Further variations and modifications of the teachings herein are possible, as will be apparent to those skilled in the polymer art. However, the scope of the present invention, which has been illustrated by means of non-limiting examples presented herein, will be understood to be defined by the appended claims.

TABLE I

MECHANICAL PROPERTIES OF POLY(IMIDE)/POLYARYLATE BLENDS AT 23° C.

| Ex. | Composition | (wt %) | 1% Sec. Mod. (kpsi) | Tens. Str. (kpsi) | Yld. El. (%) | Brk. El. (%) | Pend. Imp. | Flow (°C.) |
|---|---|---|---|---|---|---|---|---|
| A | Imide I | 100 | 299 | 14.5 | 10.5 | 11.0 | 66 | none |
| 1 | Imide I | 36 | 209 | 10.5 | 8.5 | 8.8 | 82 | — |
|   | Arylate I | 64 | | | | | | |
| D | Arylate I | 100 | 227 | 9.5 | 8.0 | 17.0 | 140 | 290 |

TABLE I-continued

MECHANICAL PROPERTIES OF POLY(IMIDE)/POLYARYLATE BLENDS AT 23° C.

| Ex. | Composition | (wt %) | 1% Sec. Mod. (kpsi) | Tens. Str. (kpsi) | Yld. El. (%) | Brk. El. (%) | Pend. Imp. | Flow (°C.) |
|---|---|---|---|---|---|---|---|---|
| B | Imide II | 100 | 301 | 14.4 | 11.0 | 20.0 | 80 | none |
| 2 | Imide II | 50 | — | — | — | — | — | 330 |
|   | Arylate I | 50 |   |   |   |   |   |   |
| C | Imide III | 100 | 289 | 14.3 | 10.4 | 13.0 | 97 | none |
| 3 | Imide III | 50 | 251 | 12.0 | 9.8 | 15.0 | 68 | 370 |
|   | Arylate I | 50 |   |   |   |   |   |   |

Notes: 1% Sec. Mod. = 1% Secant Modulus; Tens. Str. = Tensile Strength; Yld. El. = Yield Elongation, Brk. El. = Break Elongation; Pend. Imp. = Pendulum Impact Strength in units of ft-lb/in$^3$, at failure. For test procedure, see text, Control A example.

TABLE II

GLASS TRANSITION TEMPERATURES OF POLYIMIDE/POLYARYLATE BLENDS

| Ex. | Composition | (wt %) | Tg °C. Resilience Method | DSC |
|---|---|---|---|---|
| A | Imide Polymer I | 100 | 265 | 263.4 |
| 1 | Imide Polymer I | 36 | 210 | — |
|   | Polyarylate I | 64 |   |   |
| D | Polyarylate I | 100 | 190 | 192 |
| B | Imide Polymer II | 100 | 225 | 225.5 |
| 2 | Imide II | 50 | 205 | — |
|   | Arylate I | 50 |   |   |
| C | Imide III | 100 | 270 | 272 |
| 3 | Imide III | 50 | 220 | 223 |
|   | Arylate I | 50 |   |   |

TABLE III

| Ex. | Composition | (wt %) | 1% Sec. Mod. (kpsi) | Tens. Str. (kpsi) | Yld. El. (%) | Brk. El. (%) | Pend. Imp. |
|---|---|---|---|---|---|---|---|
| E | Imide I | 100 | 272 | 14.4 | none | 10 | 13 |
| F | Arylate I | 100 | 227 | 9.5 | 8.0 | 17 | 140 |
| G | Arylate II | 100 | 219 | 9.1 | 8.0 | 11 | 145 |
| H | Arylate III | 100 | 198 | 9.2 | 9.3 | 32 | 145 |
| 4 | Imide I | 50 | 253 | 11.8 | 10.3 | 11 | 68 |
|   | Arylate I | 50 |   |   |   |   |   |
| 5 | Imide I | 50 | 254 | 12.2 | none | 10 | 25 |
|   | Arylate II | 50 |   |   |   |   |   |
| 6 | Imide I | 50 | 250 | 12.4 | 9.8 | 10 | 40 |
|   | Arylate III | 50 |   |   |   |   |   |

Notes: See notes, Table I.

TABLE IV

| Ex. | Composition | (wt %) | Diacid Para/Meta | Tg (°C.) Resil. Method | DSC | Melt Flow MF10* | MF30/MF10 |
|---|---|---|---|---|---|---|---|
| E | Imide I | 100 | — | 240 | 240 | none | — |
| F | Arylate I | 100 | 50/50 | 190 | 194 | — | — |
| G | Arylate II | 100 | 0/100 | 180 | 180 | — | — |
| H | Arylate III | 100 | 25/75 | 185 | 178 | — | — |
| 4 | Imide I | 50 | 50/50 | 215 | 205 | 19.8 | 1.4 |
|   | Arylate I | 50 |   |   |   |   |   |
| 5 | Imide I | 50 | 0/100 | 210 | 200 | 26.6 | 0.77 |
|   | Arylate II | 50 |   |   |   |   |   |
| 6 | Imide I | 50 | 25/75 | 210 | 197 | 7.1 | 0.21 |
|   | Arylate III | 50 |   |   |   |   |   |

Notes: *Melt flow at 442.5 psi, dg/min after a 10 minute preheat at 375° C.

TABLE V

| Ex. | Composition | (wt %) | 1% Sec. Mod. (kpsi) | Tens. Str. (kpsi) | Yld. El. (%) | Brk. El. (%) | Pend. Imp. |
|---|---|---|---|---|---|---|---|
| I | Poly(arylate-carbonate) I | 100 | 213 | 8.5 | 8.7 | 12 | 262 |
| K | Poly(arylate-carbonate) III | 100 | 197 | 8,7 | 10.0 | 24 | 282 |
| L | Polycarbonate I | 100 | 242 | 9,5 | 6.2 | 136 | 223 |
| 7 | Imide I | 50 | 273 | 11.7 | 8.8 | 12 | 62 |
|   | Control I | 50 |   |   |   |   |   |
| 8 | Imide I | 50 | 253 | 12,0 | none | 8.3 | 38 |
|   | Control K | 50 |   |   |   |   |   |
| 11 | Imide III | 50 | 254 | 10.0 | 7.3 | 8.2 | 35 |
|   | Control L | 50 |   |   |   |   |   |

Notes: See notes, Table I.

TABLE VI

| Ex. | Composition | (wt %) | Aryl./Carb. | Tg (°C.) Resil. Method | DSC |
|---|---|---|---|---|---|
| J | Poly(arylate carbonate) I | 100 | 87/13 | 180 | 180 |

TABLE VI-continued

| Ex. | Composition | (wt %) | Aryl./Carb. | Tg (°C) Resil. Method | DSC |
|---|---|---|---|---|---|
| J | Poly(arylate carbonate) II | 100 | 40/60 | — | 180 |
| K | Poly(arylate carbonate) III | 100 | 34/66 | 180 | 179 |
| L | Polycarbonate I | 100 | 0/100 | 145 | 145 |
| 7 | Imide I | 50 | 87/13 | 215 | 198 |
|   | Control I | 50 | | | |
| 8 | Imide Polymer I | 50 | 34/66 | 175, 205 | — |
|   | Control K | 50 | | | |
| 9 | Imide III | 50 | 87/13 | — | 188 |
|   | Control I | 50 | | | |
| 10 | Imide III | 50 | 40/60 | 175, 215 | — |
|   | Control J | 50 | | | |
| 11 | Imide Polymer I | 50 | 0/100 | 150, 260 | — |
|   | Control L | 50 | | | |

Notes: Aryl./Carb. = mole ratio of arylate to carbonate linkages; Resil. Method = Resilience method; DSC = Differential Scanning Calorimeter method.

TABLE VII
MISCIBILITY OF VARIOUS POLYCARBONOMIDES WITH ARYLATE I (50/50)

| Ex. | Imide In Blend | wt % Isopropylidene Groups | Imide Content | 8-3(Imide) | Miscible |
|---|---|---|---|---|---|
| 1 | Imide I | 13.3 | 1 | 5 | Yes |
| 2 | Imide II | 6.0 | 1 | 5 | Yes |
| 3 | Imide III | 16.8 | 0.5 | 6.5 | Yes |
| 12 | Imide IV | 5.1 | 0.5 | 6.5 | No |
| 13 | Imide V | 3.6 | 0.5 | 6.5 | No |
| 14 | Imide VI | 14.0 | 1 | 5 | Yes |
| 15 | Imide VII | 15.2 | 0.75 | 5.75 | Yes |
| 16 | Imide VIII | 6.3 | 1 | 5 | Yes |

What is claimed is:

1. A miscible blend comprising a polyarylate and a polycarbonomide, said polycarbonomide comprising recurring units having the formula:

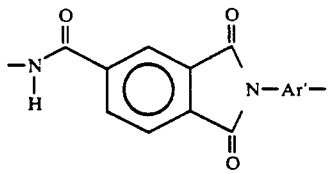

wherein Ar' is an aromatic carbocyclic radical consisting of a plurality of aromatic nuclei linked through isopropylidene moieties, and wherein said polycarbonomide comprises greater than about 5 wt. % isopropylidene moieties.

2. The miscible blend of claim 1 wherein Ar' is

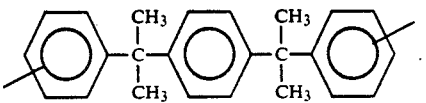

3. The blend of claim 1 wherein said polycarbonomide comprises recurring units of the following formula:

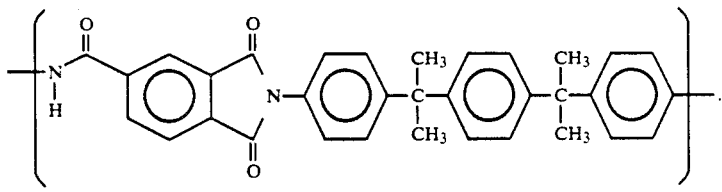

4. The miscible blend of claim 1 wherein the wt. % of said isopropylidene moieties is greater than or equals the quantity (8-3(imide)), wherein (imide) is the fraction of imide groups in said polycarbonomide.

5. The miscible blend of claim 1 wherein the polyarylate is an arylate-carbonate copolymer.

* * * * *